(12) United States Patent
Randall et al.

(10) Patent No.: US 7,443,306 B2
(45) Date of Patent: Oct. 28, 2008

(54) TOILET TRAINING APPARATUS

(76) Inventors: Randy I. Randall, 3870 W. Roxbury St., Springfield, MO (US) 65807; Stacey Randall, 3870 W. Roxbury St., Springfield, MO (US) 65807

( * ) Notice: Subject to any disclaimer, the term of this patent is extended or adjusted under 35 U.S.C. 154(b) by 0 days.

(21) Appl. No.: 11/375,303

(22) Filed: Mar. 14, 2006

(65) Prior Publication Data

US 2007/0222618 A1   Sep. 27, 2007

(51) Int. Cl.
   *G08B 23/00*   (2006.01)
(52) U.S. Cl. .............................. 340/573.5; 340/309.16
(58) Field of Classification Search ............. 340/573.1, 340/573.5, 309.16, 527, 529
See application file for complete search history.

(56) References Cited

U.S. PATENT DOCUMENTS

| | | | | |
|---|---|---|---|---|
| 3,810,140 | A | | 5/1974 | Finley |
| 4,012,732 | A | * | 3/1977 | Herrick ................... 340/573.1 |
| 4,163,449 | A | | 8/1979 | Regal |
| 4,316,273 | A | | 2/1982 | Jetter |
| 4,359,723 | A | * | 11/1982 | Cohen ..................... 340/573.1 |
| 5,137,033 | A | | 8/1992 | Norton |
| 5,764,594 | A | | 6/1998 | Berman et al. |
| 6,072,384 | A | | 6/2000 | Baker |
| 6,294,994 | B1 | * | 9/2001 | Hoellerich .................. 340/540 |
| 6,384,728 | B1 | | 5/2002 | Kanor et al. |
| 2005/0275544 | A1 | * | 12/2005 | Reustle .................... 340/573.1 |

* cited by examiner

*Primary Examiner*—Thomas J Mullen, Jr.
(74) *Attorney, Agent, or Firm*—Dale J. Ream

(57) ABSTRACT

A toilet training apparatus according to the present invention includes a processor that is in data communication with a timer, a first alarm, and a presence sensor. At a predetermined time, the processor actuates the first alarm to awaken a sleeping toddler to urge him to go to the bathroom and, thus, proactively, avoid wetting the bed. The first alarm may include an audio or vibratory alarm, or both. The apparatus includes a presence sensor, such as a RFID tag/reader combination, for sensing if the toddler has in fact moved from his bed to the bathroom. Upon sensing the expected movement, the first alarm is reset for a next predetermined waking event. If this movement is not sensed in a predetermined time, the processor actuates a second alarm to awaken a parent to assist in awakening the toddler.

17 Claims, 6 Drawing Sheets

TOILET TRAINING APPARATUS

BACKGROUND OF THE INVENTION

The present invention relates generally to toilet training devices and, more particularly, to a toilet training apparatus that awakens and urges a child to go to the bathroom before wetting the bed and that awakens a parent if the child fails to do so.

Toilet training a toddler can sometimes be a tedious experience that requires much patience and persistence. Even when a child has learned this skill during the day, however, staying dry at right is still a challenge. The major difficulty is that a young child may not yet be sensitive enough to the urge to urinate to be naturally awakened and to move himself to a toilet. This delay, of course, results in bedwetting.

Various devices have been proposed in the art for dealing with the problem of bedwetting. These devices, however, typically attempt to detect when a child has begun to urinate and then seeks to wake the child. Further, these devices either require a sensor to be worn by a child or to have sensors placed on the child's bed. While assembly effective to notify the child and urge him to hurry to the bathroom, such devices do not proactively train a child to wake up prior to urinating so as to completely avoid a bedwetting event.

Therefore, it would be desirable to have an apparatus that periodically awakens a child and urges him to proactively walk to the bathroom prior to wetting the bed. Further, it would be desirable to have an apparatus that awakens a parent if the child does not respond to the notification to awaken.

SUMMARY OF THE INVENTION

Accordingly, a toilet training apparatus according to the present invention includes a processor that is coupled in data communication with a timer, a first alarm, and a presence sensor. The processor includes programming for actuating the first alarm when the timer indicates a predetermined time and for disabling the first alarm upon sensing a predetermined time event. The first alarm may be an audible or vibration alarm for waking a toddler at a predetermined time in the night or at set intervals of time. The purpose of the first alarm is to urge the toddler to get out of bed, take a trip to the bathroom, and then to return to bed. The presence sensor is able to sense if the toddler has left the bedroom or, alternately, to sense that the toddler has entered the bathroom. When this "presence event" is sensed, the processor disables the first alarm and resets the timer.

The toilet training apparatus may also include a second alarm in data communication with the processor. The processor includes programming for actuating the second alarm if the first alarm is not disabled after a certain period of time after being actuated. The purpose of the second alarm is to notify a parent if the toddler has not moved to the bathroom in a predetermined time following actuation of the first alarm. In this instance, the parent is able to personally wake the child and take them to the bathroom.

Therefore, a general object of the present invention is to provide a toddler training apparatus that proactively wakes and urges a toddler to visit the bathroom before wetting his bed.

Another object of the present invention is to provide a toddler training apparatus, as aforesaid, having a first alarm for waking a toddler at a predetermined time or at a predetermined time interval.

Still another object of the present invention is to provide a toddler training apparatus, as aforesaid, having a presence sensor for sensing if the toddler either leaves his bedroom or enters a bathroom.

A further object of the present invention is to provide a toddler training apparatus, as aforesaid, that disables the first alarm when the toddler leaves his bedroom and moves into the bathroom.

Yet another object of the present invention is to provide a toddler training apparatus, as aforesaid, having a second alarm that is actuated if the first alarm is not disabled after a predetermined amount of time, whereby to notify a parent that the child has not responded to the first alarm.

A still further object of the present invention is to provide a toddler training apparatus, as aforesaid, in which the first alarm may be an audible or vibratory alarm.

Other objects and advantages of the present invention will become apparent from the following description taken in connection with the accompanying drawings, wherein is set forth by way of illustration and example, an embodiment of this invention.

BRIEF DESCRIPTION OF THE DRAWINGS

FIG. 1b is a front view of the toilet training apparatus as in FIG. 1a;

DESCRIPTION OF THE PREFERRED EMBODIMENT

Figure 1A:
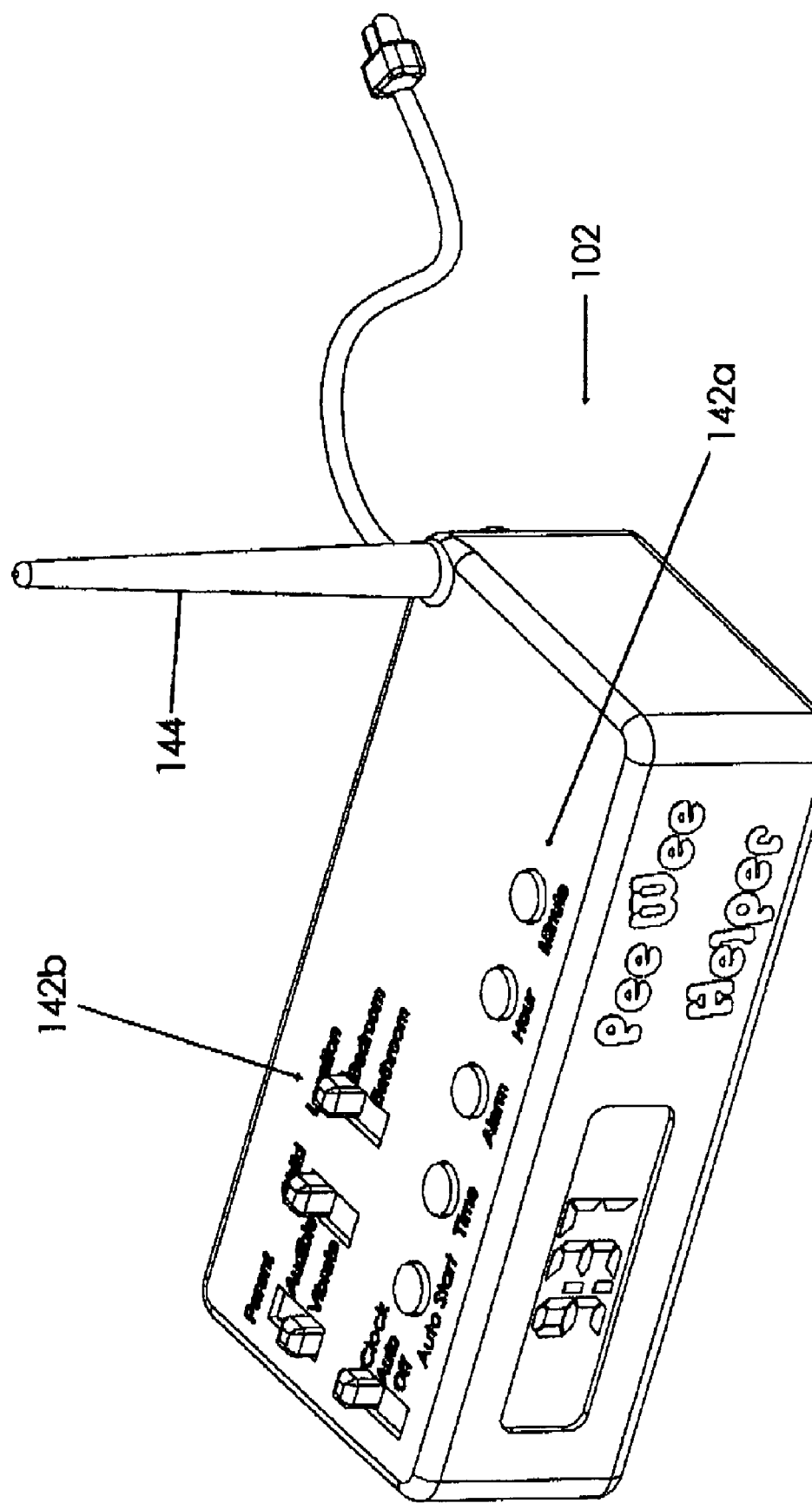
FIG. 1a is a perspective view of a toilet training apparatus according to a preferred embodiment of the present invention.
Figure 1B:
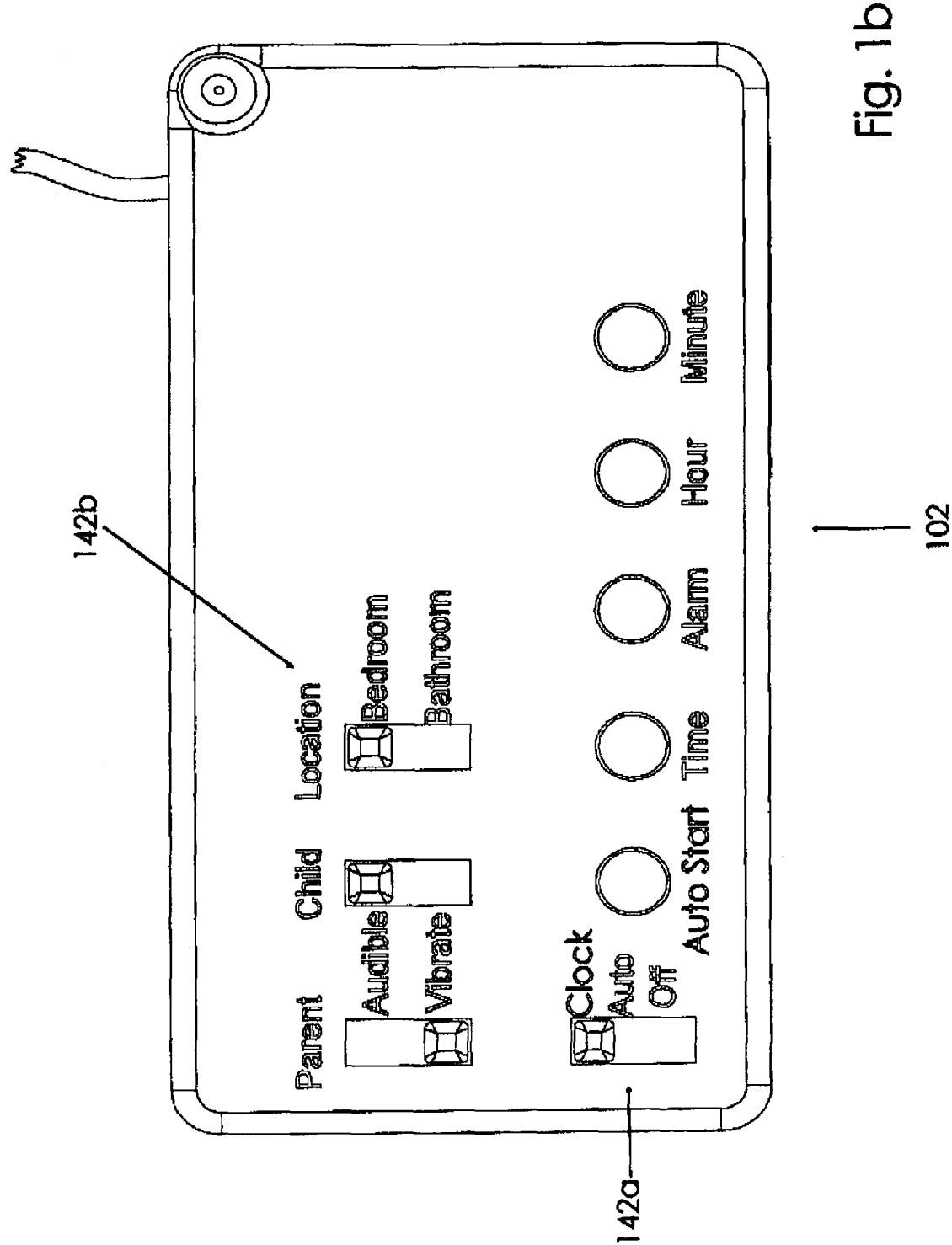

A toilet training apparatus 100 for a child according to the present invention will now be described in detail with reference to FIGS. 1 through 5 of the accompanying drawings. More particularly, a toilet training apparatus 100 according to the current invention includes a first alarm 110, a timer 120, a presence sensor 130, and a processor 140.

Figure 5:
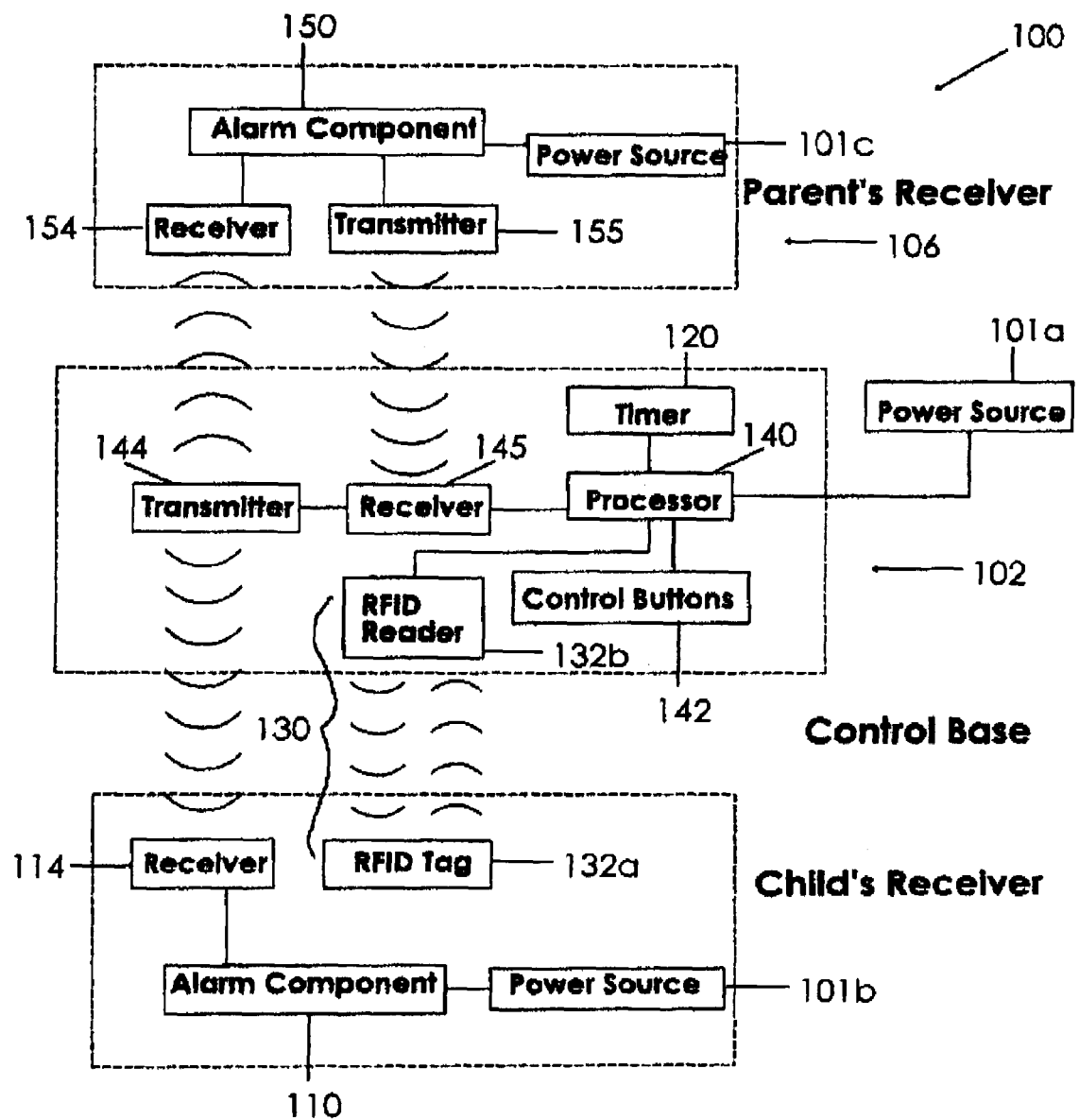
FIG. 5 is a block diagram illustrating operation of the electronic components of the present invention.

The processor 140 is in data communication with the first alarm 110, the timer 120, and the presence sensor 130, as shown in FIG. 5. The processor 140 has programming for actuating the first alarm 110 upon the timer 120 reaching a predetermined time event and disabling the first alarm 110 upon the presence sensor 130 sensing a predetermined presence event. A predetermined time event may be, for example, a predetermined time of day or a predetermined time interval. It should be appreciated that "day" is used herein to denote a 24-hour time period, and that it also encompasses night. A predetermined presence event may be, for example, the child's presence adjacent the presence sensor 130 or the absence of the child's presence adjacent the presence sensor 130. An input device 142a may be in data communication with the processor 140 for allowing a user to select the predetermined time event, and an input device 142b may be in data communication with the processor 140 for allowing the user to select the predetermined presence event. The input device 142a and the input device 142b may be separate input devices (FIGS. 1a and 1b), or they may be a single input device 142 (FIG. 5). A power source 101a (e.g., 110 volt AC power, a battery, etc.) powers the processor 140.

As shown in FIG. 5, the timer 120, the processor 140, and the input device 142 may be associated with a control base 102, and the first alarm 110 may be associated with a device 104 for the child. The processor 140 may communicate with the first alarm 110 through a transmitter 144 associated with the processor 140 and a receiver 114 associated with the first alarm 110. The first alarm 110 may be powered by a second power source 101b (e.g., a battery), and the first alarm 110 may be an audible alarm, a vibrating alarm, or a vibrating audible alarm.

Figure 2:
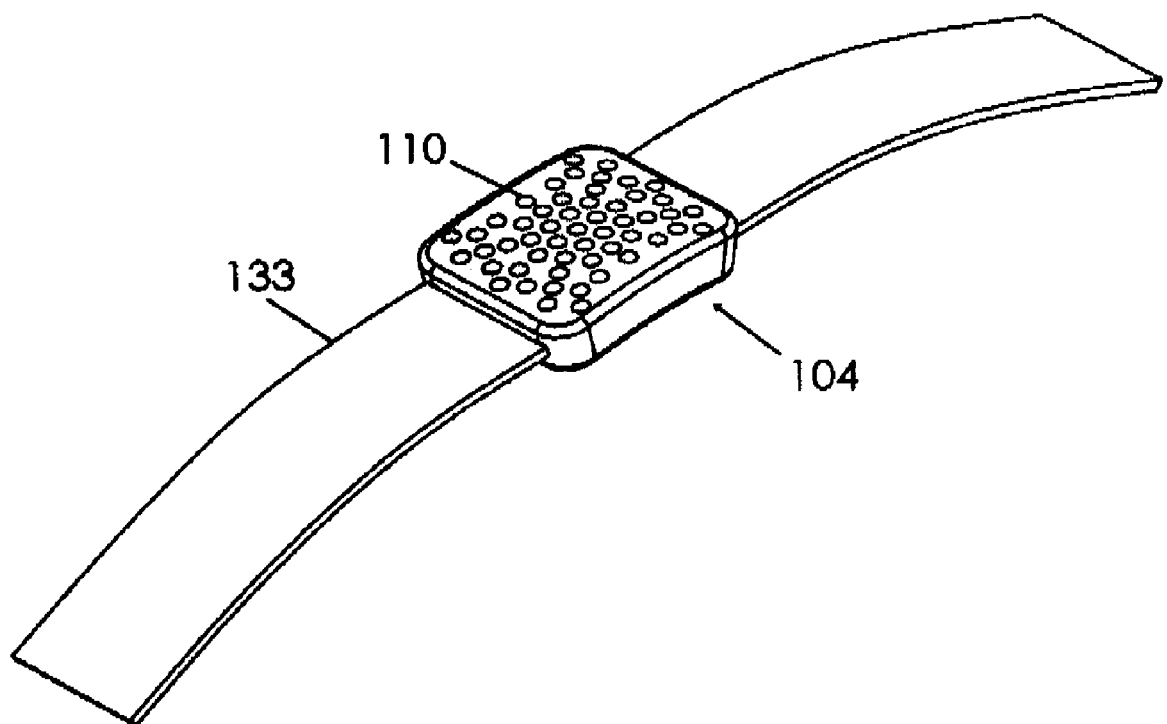
FIG. 2 is a perspective view of a first alarm device according to the present invention.

The presence sensor 130 may incorporate various presence-sensing technologies, but it is presently preferred that the presence sensor 130 includes a RFID tag 132a and a RFID reader 132b. The RFID tag 132a may be associated with the child's device 104, and as shown in FIG. 2, the RFID tag 132a may be attached to a coupling device 133 (e.g., a wristband, ankle band, necklace, etc.). This ensures that the location of the RFID tag 132a is the same as the location of the child. While the RFID tag 132a and the RFID reader 132b is shown in FIG. 5 as being passive, they may alternately be active; the RFID tag 132a may be associated with a power source. Passive RFID systems are currently smaller in size and less expensive than active RFID systems, though active RFID systems have the capability of tracking multiple RFID tags.

As shown in FIG. 5, the toilet training apparatus 100 may further include a second alarm 150 in data communication with the processor 140. The processor 140 has programming for actuating the second alarm 150 if the first alarm 110 is not disabled within a predetermined length of time. The second alarm 150 may be associated with a device 106 for a parent or guardian and may be powered by a third power source 101c (e.g., a battery). The parent's device 106 may be attachable to the parent through a coupling device similar to coupling device 133, or the parent's device 106 may be a stationary device that is not attached to the parent. Further, the second alarm 150 may be an audible alarm, a vibrating alarm, or a vibrating audible alarm. The processor 140 may communicate with the second alarm 150 through the transmitter 144 associated with the processor 140 and a receiver 154 associated with the second alarm 150. A transmitter 155 associated with the second alarm 150 may further send data from the second alarm 150 to a receiver 145 associated with the processor 140.

Figure 3:
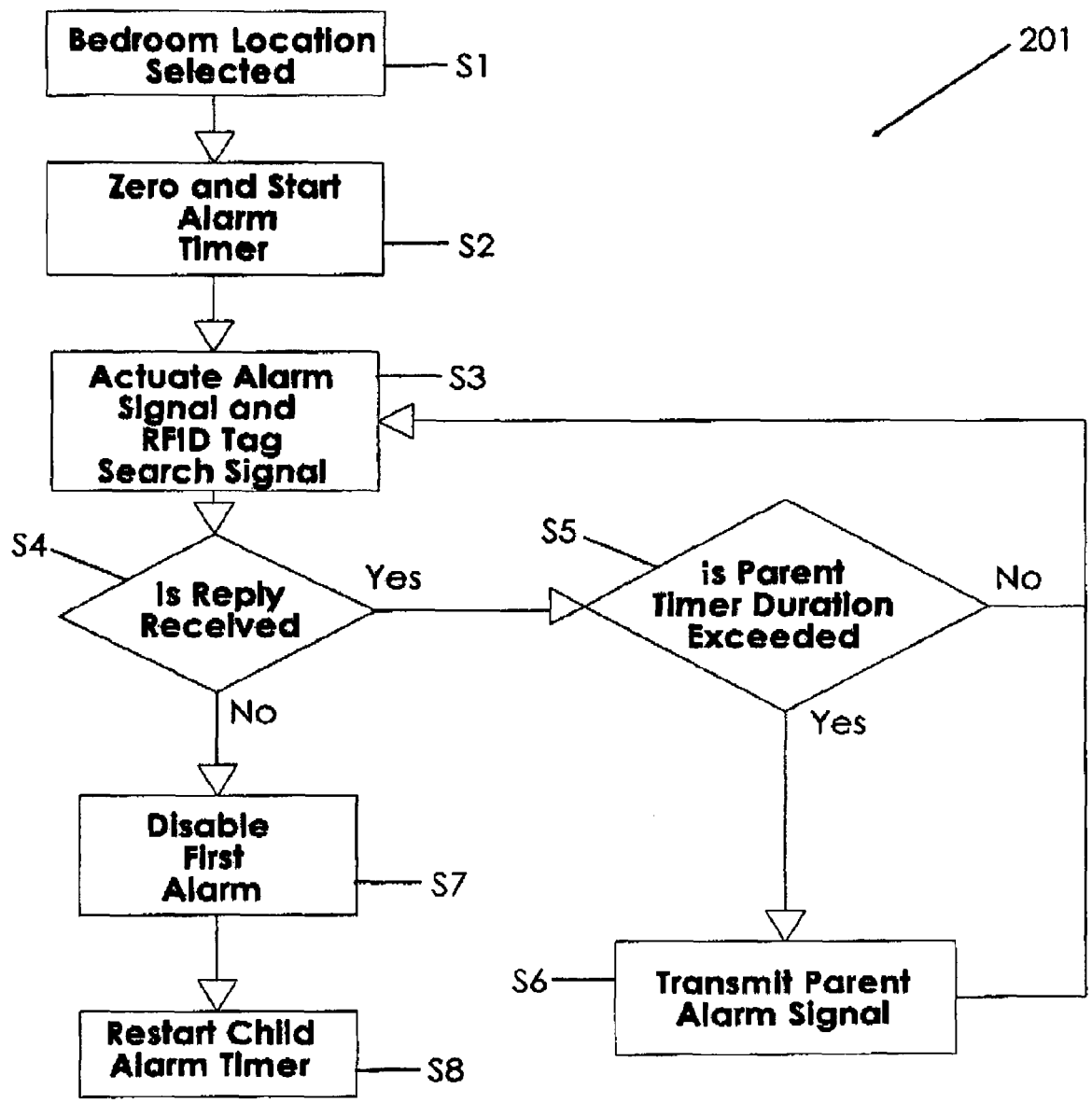
FIG. 3 is a flowchart illustrating the logic of a processor according to the present invention.
Figure 4:
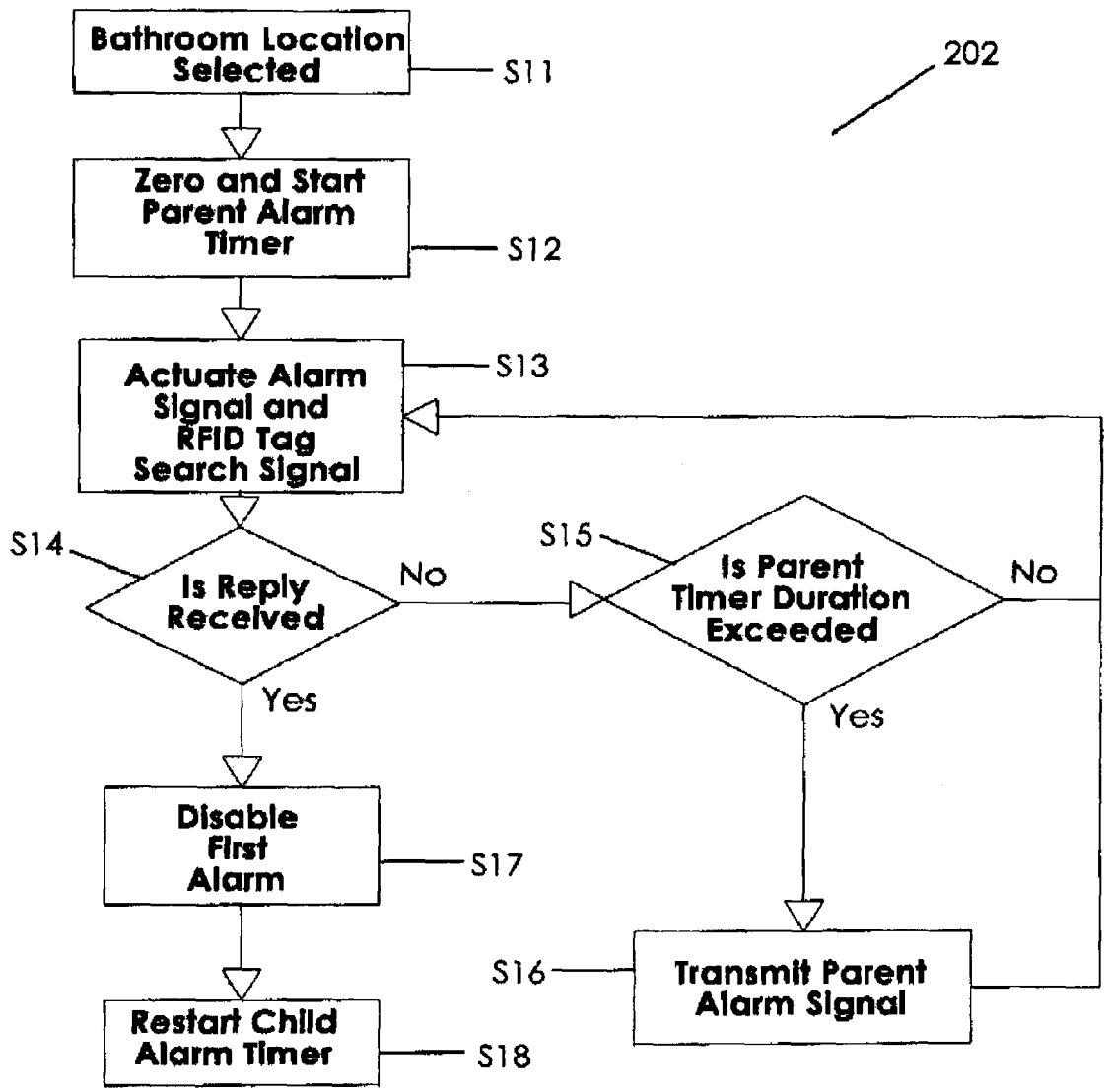
FIG. 4 is a flowchart illustrating the logic of the processor according to another embodiment of the present invention.

In use, the toilet training apparatus 100 may proceed as shown in FIGS. 3 and 4. If the control base 102 is to be positioned in the child's bedroom, then the user selects bedroom location with the input device 142b. The apparatus 100 then proceeds as shown in FIG. 3. If the control base 102 is to be positioned in a bathroom, then the user selects bathroom location with the input device 142b. The apparatus 100 then proceeds as shown in FIG. 4.

At step S1 of process 201 shown in FIG. 3, the user places the control base 102 in the child's bedroom and selects bedroom location with the input device 142b. The process then proceeds to step S2.

At step S2, the user selects the predetermined time event using the input device 142a. This may be, for example, a specific time (e.g., 11:00 pm) or a specific time interval (e.g., 3 hours). The process then proceeds to step S3.

At step S3, the processor 140 actuates the first alarm 110 and the RFID reader 132b sends out signals searching for the RFID tag 132a when the timer 120 reaches the predetermined time event. The process then proceeds to step S4.

At step S4, the RFID reader 132b or the processor 140 determines whether a reply signal was received from the RFID tag 132a. If a reply signal was received, the process then proceeds to step S5; if a reply signal was not received, the process then proceeds to step S7. Receiving a reply signal indicates that the RFID tag 132a (and therefore the child) is still in the bedroom.

At step S5, the processor 140 determines whether a predetermined amount of time has passed without the first alarm 110 being disabled. If not, the process returns to step S3. If so, the process is directed to step S6.

At step S6, the processor 140 actuates the second alarm 150. The process then returns to step S3.

At step S7, the processor 140 disables the first alarm 110 because the RFID tag 132a (and therefore the child) has left the bedroom—presumably to go to the bathroom. The process then continues to step S8, where the processor 140 waits for the timer 120 to reach the next predetermined time event. The process will then return to step S3 when the timer 120 reaches the next predetermined time event.

Turning now to process 202 shown in FIG. 4, at step S11, the user places the control base 102 in a bathroom and selects bathroom location with the input device 142b. The process then proceeds to step S12.

At step S12, the user selects the predetermined time event using the input device 142a. This may be, for example, a specific time (e.g., 11:00 pm) or a specific time interval (e.g., 3 hours). The process then proceeds to step S13.

At step S13, the RFID reader 132b sends out signals searching for the RFID tag 132a. The process then proceeds to step S14.

At step S14, the RFID reader 132b or the processor 140 determines whether a reply signal was received from the RFID tag 132a. If a reply signal was not received, the process then proceeds to step S15; if a reply signal was received, the process then proceeds to step S17. Not receiving a reply signal indicates that the RFID tag 132a (and therefore the child) has not yet made it to the bathroom.

At step S15, the processor 140 determines whether a predetermined amount of time has passed without the first alarm 110 being disabled. If not, the process returns to step S13. If so, the process is directed to step S16.

At step S16, the processor 140 actuates the second alarm 150. The process then returns to step 1S3.

At step S17, the processor 140 disables the first alarm 110 because the RFID tag 132a (and therefore the child) has entered the bathroom. The process then continues to step S18, where the processor 140 waits for the timer 120 to reach the next predetermined time event. The process will then return to step S13 when the timer 120 reaches the next predetermined time event.

It is understood that while certain forms of this invention have been illustrated and described, it is not limited thereto except insofar as such limitations are included in the following claims and allowable functional equivalents thereof.

What is claimed is as follows:

1. A toilet training apparatus for a child, comprising:
a timer;
a first alarm;
a presence sensor;
a processor in data communication with said timer, said first alarm, and said presence sensor; said processor having programming for actuating said first alarm upon said timer reaching a predetermined time event and disabling said first alarm upon said presence sensor sensing a predetermined presence event;
wherein said predetermined presence event is the absence of the child's presence adjacent the presence sensor.

2. The apparatus of claim 1, wherein said predetermined time event is a predetermined time of day.

3. The apparatus of claim 1, wherein said predetermined time event is a predetermined time interval.

4. The apparatus of claim 1, wherein said presence sensor includes:
 a RFID tag; and
 a RFID reader.

5. The apparatus of claim 4, wherein said RFID tag is attached to a coupling device for coupling the RFID tag to the child.

6. The apparatus of claim 1, wherein said first alarm is selected from the group consisting of an audible alarm a vibrating alarm, and a vibrating audible alarm.

7. The apparatus of claim 1, wherein:
 a second alarm is in data communication with said processor; and
 said processor includes programming for actuating said second alarm if said first alarm is not disabled within a predetermined length of time.

8. The apparatus of claim 7, wherein:
 said processor is in data communication with a transmitter; and
 said second alarm is in data communication with a receiver for receiving data from said transmitter.

9. The apparatus of claim 1, further comprising an input device for selecting said predetermined time event.

10. The apparatus of claim 1, further comprising an input device for selecting said predetermined presence event.

11. The apparatus of claim 1, wherein:
 said predetermined time event is selected from the group consisting of a predetermined time of day and a predetermined time interval;
 said predetermined presence event is selected from the group consisting of the child's presence adjacent the presence sensor and the absence of the child's presence adjacent the presence sensor; and
 said presence sensor includes a RFID tag and a RFID reader.

12. The apparatus of claim 11, wherein:
 a second alarm is in data communication with said processor;
 said processor includes programming for actuating said second alarm if said first alarm is not disabled within a predetermined length of time; and
 an input device is in data communication with said processor for allowing a user to select said predetermined time event and said predetermined presence event.

13. A toilet training apparatus for a child, comprising:
 a timer;
 a first alarm;
 a presence sensor; and
 a processor in data communication with said timer, said first alarm, and said presence sensor; said processor performing functions including:
 actuating said first alarm upon said timer reaching a predetermined time event;
 disabling said first alarm upon said presence sensor sensing a predetermined presence event;
 wherein a second alarm is in data communication with said processor; and
 wherein said processor performs additional functions, including actuating said second alarm if said first alarm is not disabled within a predetermined length of time.

14. The apparatus of claim 13, wherein said predetermined presence event is the child's presence adjacent the presence sensor.

15. The apparatus of claim 14, wherein said presence sensor includes a RFID tag and a RFID reader.

16. The apparatus of claim 13, wherein:
 said predetermined time event is selected from the group consisting of a predetermined time of day and a predetermined time interval;
 said predetermined presence event is selected from the group consisting of the child's presence adjacent the presence sensor and the absence of the child's presence adjacent the presence sensor; and
 said presence sensor includes a RFID tag and a RFID reader.

17. The apparatus of claim 16, wherein said RFID tag is a passive RFID tag.

* * * * *